(12) United States Patent
Ozaki et al.

(10) Patent No.: US 7,168,562 B2
(45) Date of Patent: Jan. 30, 2007

(54) ROLL CONTAINER WITH PRESSER PLATES

(75) Inventors: Kouki Ozaki, Aichi (JP); Masanori Tsutsui, Aichi (JP); Manabu Iwaida, Saitama (JP); Shigeki Oyama, Saitama (JP); Kenichi Murakami, Saitama (JP)

(73) Assignees: Daido Metal Company, Ltd., Aichi (JP); Honda Motors Co., Ltd., Tokyo (JP)

( * ) Notice: Subject to any disclaimer, the term of this patent is extended or adjusted under 35 U.S.C. 154(b) by 368 days.

(21) Appl. No.: 10/724,368

(22) Filed: Dec. 1, 2003

(65) Prior Publication Data

US 2004/0163984 A1 Aug. 26, 2004

(30) Foreign Application Priority Data

Nov. 29, 2002 (JP) ............................. 2002-347943

(51) Int. Cl.
*B65D 85/66* (2006.01)
*B65D 85/04* (2006.01)
*B65D 81/28* (2006.01)
*B65H 16/00* (2006.01)

(52) U.S. Cl. .................... 206/416; 206/54; 206/213.1; 206/713; 242/588.6

(58) Field of Classification Search ............. 206/213.1, 206/389–417, 701, 713–717; 242/588.6
See application file for complete search history.

(56) References Cited

U.S. PATENT DOCUMENTS 2,339,475 A * 1/1944 Hartsell et al. ............. 206/408
3,136,415 A * 6/1964 Sandstrom .................. 206/403
3,208,585 A * 9/1965 Hultgren et al. ............ 206/406
5,027,949 A * 7/1991 Terwilliger et al. ......... 206/406
5,215,192 A * 6/1993 Ram et al. .................. 206/389
5,364,045 A * 11/1994 Clayton et al. ........... 242/588.6
5,542,534 A * 8/1996 Dinter et al. ............... 206/407

FOREIGN PATENT DOCUMENTS

| JP | 61-69072 U | 5/1986 |
| JP | 64-47662 U | 3/1989 |
| JP | 02-082083 A | 3/1990 |
| JP | 03-29476 U | 3/1991 |
| JP | 2000-327078 A | 11/2000 |

OTHER PUBLICATIONS

Patent Abstracts of Japan, 2000-238830, Sep. 5, 2000, Furuta Tomoyasu.

* cited by examiner

*Primary Examiner*—Bryon P. Gehman
(74) *Attorney, Agent, or Firm*—Browdy and Neimark, PLLC

(57) ABSTRACT

A container for a long electrode sheet for electric double layer capacitor includes a cover closing the opening of the container body, a sealing member sealing a gap between the container body and the cover, a stem fixed to either the container body or the cover so that a bobbin is mounted thereon and formed with a male thread, a bobbin fixing unit including a fastening member having a female thread hole, and a holding unit including two presser plates, the female thread hole of the fastening member being threadedly engage with the male thread of the stem so that the presser plates are fastened thereby to be fixed, the holding unit holding the electrode sheet so as to prevent the electrode sheet from being detached from the bobbin by pressing two ends of electrode sheet.

3 Claims, 4 Drawing Sheets

ROLL CONTAINER WITH PRESSER PLATES

BACKGROUND OF THE INVENTION

1. Field of the Invention

This invention relates to a container for containing a long article wound on a bobbin into a roll while the article is prevented from being damaged.

2. Description of the Related Art

Global nets of logistics have been built nowadays. With this, the transportation technology has shown a remarkable development. For example, tracks equipped with an air suspension system are used for transportation of precision apparatus such as an engine of airplane, for example.

A technology of containers for packing or otherwise containing articles to be transported has also been improved as well as the transportation technology. More specifically, the containers have been improved for the purpose of transporting articles contained therein safely without changes in the quality of the articles. For example, a shockproof container provided with a cushion is used to contain computers, glassware or the like since these articles dislike swinging or shock. Thus, defects of articles to be contained in the container have been grasped and countermeasures have been taken to overcome the defects.

Transportation of electrode sheets for electric double layer capacitors is now exemplified. An electric double layer capacitor has a large capacity in the farad level and is superior in a charge and discharge cycle characteristic. Accordingly, the electric double layer capacitors have been used as backup powers for various electronic devices and as batteries of transportation means such as automobiles. Furthermore, the electric double layer capacitors have been proposed to be used for storage of night or midnight power from the point of effective use of energy, and the proposal is under study.

An electric double layer capacitor will now be described in brief. A polarizable electrode for the electric double layer capacitor comprises a pair of positive and negative electrode sheets each of which comprises a collecting foil sandwiched between sheet electrodes and an insulating separator through which ion can penetrate. The polarizable electrode is immersed in an ionic liquid. Voltage causing no electrolysis is applied to the positive and negative electrodes so that positive electricity and negative electricity are opposed to each other on an interface, whereby electric charge and discharge are induced.

An electrode sheet is made as a long exceedingly thin sheet. The electrode sheet is cut into pieces each with predetermined dimensions in a capacitor manufacturing factory. The electrode sheet is wound into a roll and contained in a container for the transportation purpose. When the electrode sheet adsorbs moisture in an atmosphere during transportation, the water content is electrolyzed upon application of voltage to the electrode sheet. As a result, the performance of the electric double layer capacitor is reduced. In view of this problem, a closed container is used for the transportation of the electrode sheet.

JP-A-2000-238830 discloses one of such closed containers. The disclosed container comprises a cover made of stainless steel. A fluororesin packing is attached to the cover. The cover is fixed to an open end of a container body by a stainless steel fastening member, whereby the container is hermetically closed.

In the foregoing conventional container, however, the wound electrode sheet moves around freely in the container, whereupon the electrode sheet is unwound or collides against the inner wall of the container thereby to be damaged.

SUMMARY OF THE INVENTION

Therefore, an object of the present invention is to provide a container for a roll which can safely transport the roll while the roll is prevented from being unwound or damaged.

The present invention provides a container for containing a roll formed by winding a long electrode sheet for electric double layer capacitors on a bobbin, the electrode sheet having a predetermined width perpendicular to a length thereof and being formed by placing electrodes on both sides of a current collector. The roll formed by winding the long electrode sheet having two radially extending sides spaced apart by an amount equal to substantially the predetermined width. Each electrode is formed by carbonaceous powder with a binder resin. The container includes a container body having at least one end formed with an opening and made of a stainless steel, a cover closing the opening of the container body and made of a stainless steel, a sealing member sealing a gap between the container body and the cover, a stem fixed to either the container body or the cover so that the bobbin is mounted thereon, the stem being made of a stainless steel and formed with a male thread, a bobbin fixing unit including a fastening member having a female thread hole and made of fluororesin, the bobbin fixing unit for fastening the bobbin, thereby fixing the bobbin, and a holding unit including two presser plates, each of which is made of a stainless steel and has a through hole. The holding unit is located at the two ends of the electrode sheet wound on the bobbin while the stem is inserted through the holes of the presser plates, respectively. The female thread hole of the fastening member is threadedly engage with the male thread of the stem, so that the presser plates are fastened thereby to be fixed. The holding unit holds the electrode sheet so as to prevent the electrode sheet from being detached from the bobbin while pressing the two ends of the electrode sheet.

In the above-described construction, the stem extends through the through hole of the article when the article has been mounted on the stem. Accordingly, even when the container is shaken, the roll can be prevented from moving or colliding against the inner wall of the container. Furthermore, since the widthwise ends of the roll are pressed, the article can be prevented from being unwound.

BRIEF DESCRIPTION OF THE DRAWINGS

Other objects, features and advantages of the present invention will become clear upon reviewing the following description of the embodiment, made with reference to the accompanying drawings, in which.

DETAILED DESCRIPTION OF THE INVENTION

Figure 4:
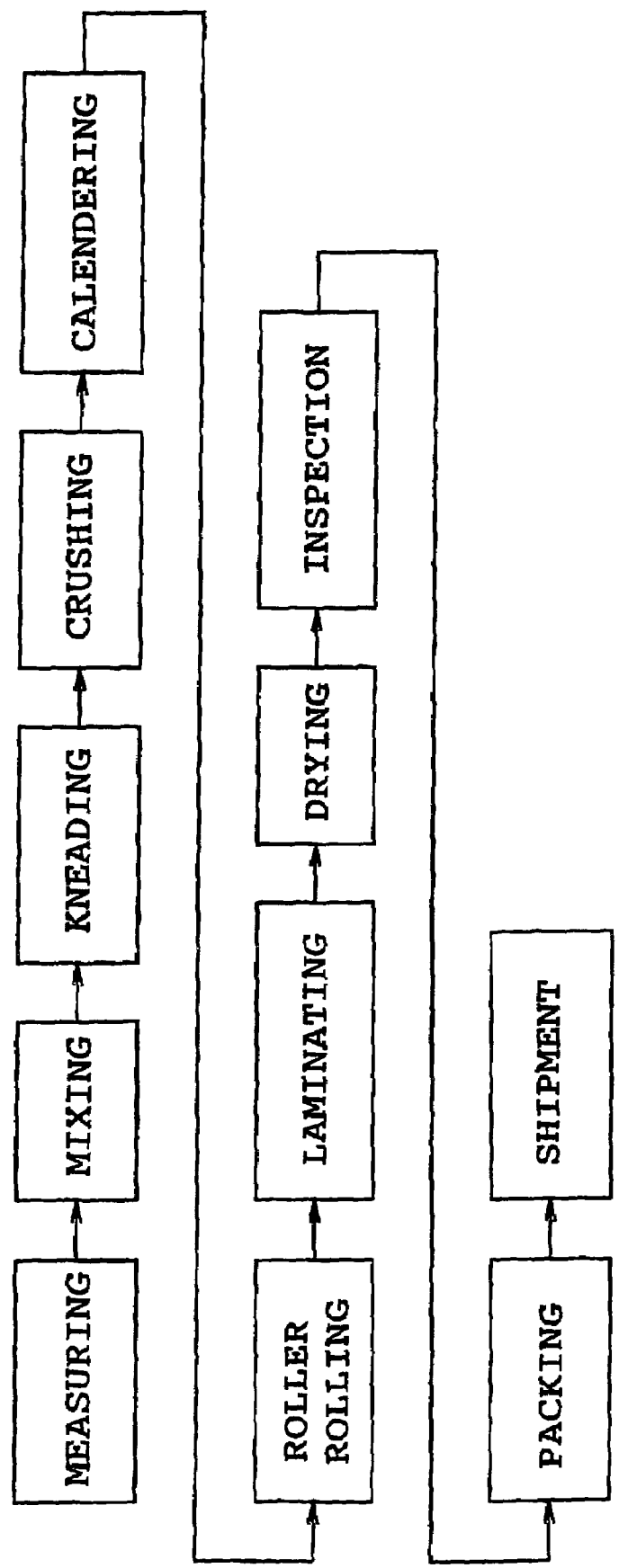
FIG. 4 schematically illustrates an overall process of fabricating an electrode sheet for an electric double layer capacitor.

An embodiment of the present invention will be described with reference to the drawings. In the embodiment, the invention is applied to a container particularly suitable for use in transportation of an electrode sheet for electric double layer capacitor. Referring first to FIG. 4, sequential steps of a method of making an electrode sheet for an electric double layer capacitor are shown. Materials for a sheet electrode applied to both sides of a collector foil comprise activated carbon as carbonaceous powder, carbon black as a conductive assistant, polytetrafluoroethylene (PTFE) as a binder and isopropyl alcohol (IPA) as a binder assistant (organic solvent).

In making the electrode sheet, each aforesaid material is measured. Subsequently, the activated carbon and the carbon black are mixed together into a primary mixture and thereafter, PTFE and IPA are further added to the primary mixture and mixed together, whereupon a secondary mixture is obtained. Subsequently, the mixture is put into a kneader and kneaded into a kneaded material while being pressurized in it. The kneaded material is then crushed by a crushing machine into fine grain. The fine grain is then formed by a calendering machine into a sheet material.

The sheet material is rolled between two rolling rollers. The roller rolling is carried out once or at a plurality of times so that a sheet electrode with a predetermined thickness is obtained. Subsequently, the sheet electrode and an aluminum foil serving as the collector foil are laminated together into an electrode sheet. The electrode sheet thus made is wound onto a bobbin. A roll of the electrode sheet is heated to be dried. After a final inspection, the electrode sheet is re-wound onto the bobbin and then contained in the container for shipment. The foregoing drying step may additionally include a vacuum drying step in which the electrode sheet is dried in a vacuum chamber. The foregoing drying to containing steps are carried out in a dry area in order that the dried electrode sheet may be prevented from adsorbing moisture during the containing step.

Figure 2:
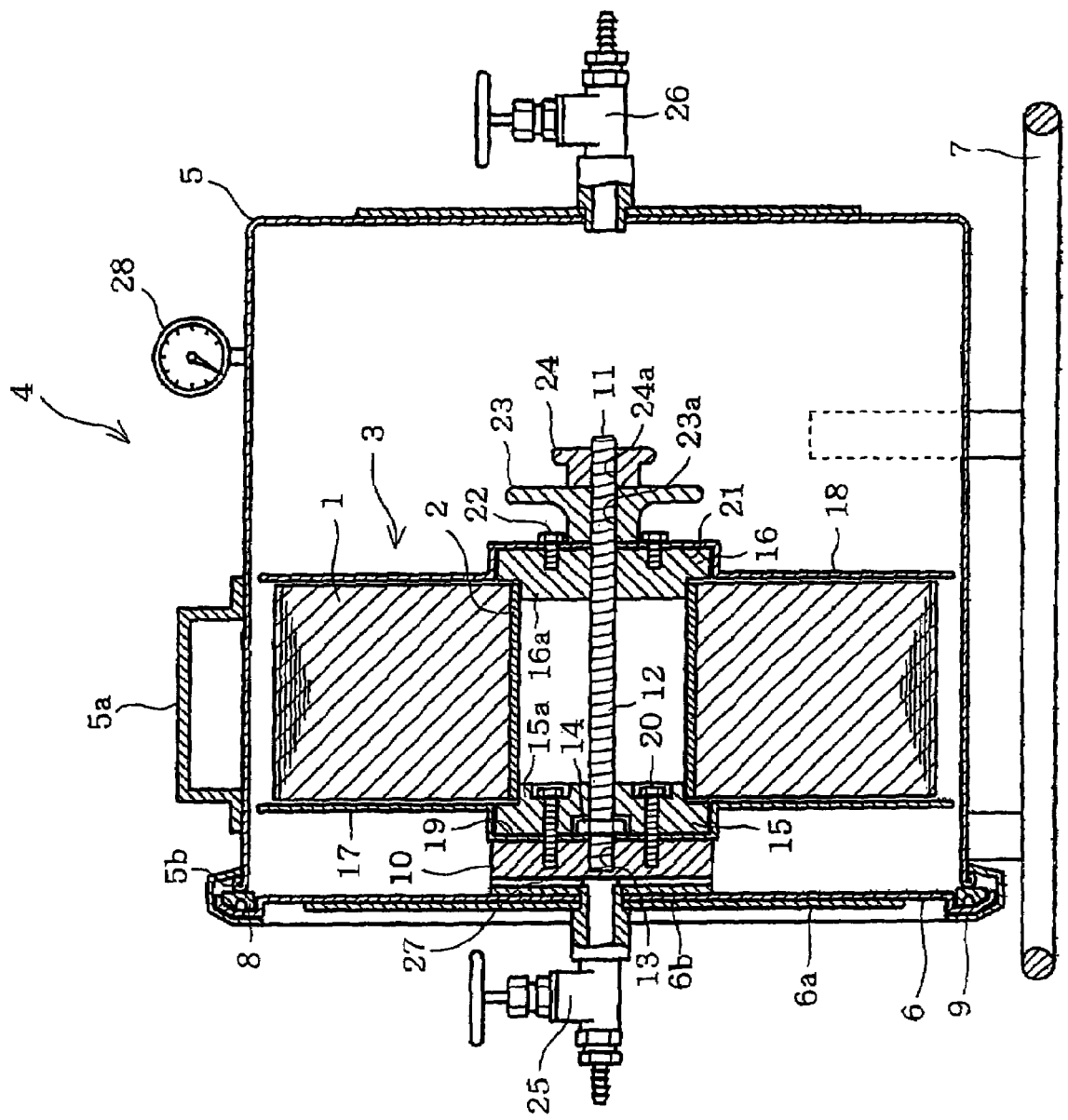
FIG. 2 is a longitudinal side section of the container.
Figure 3:
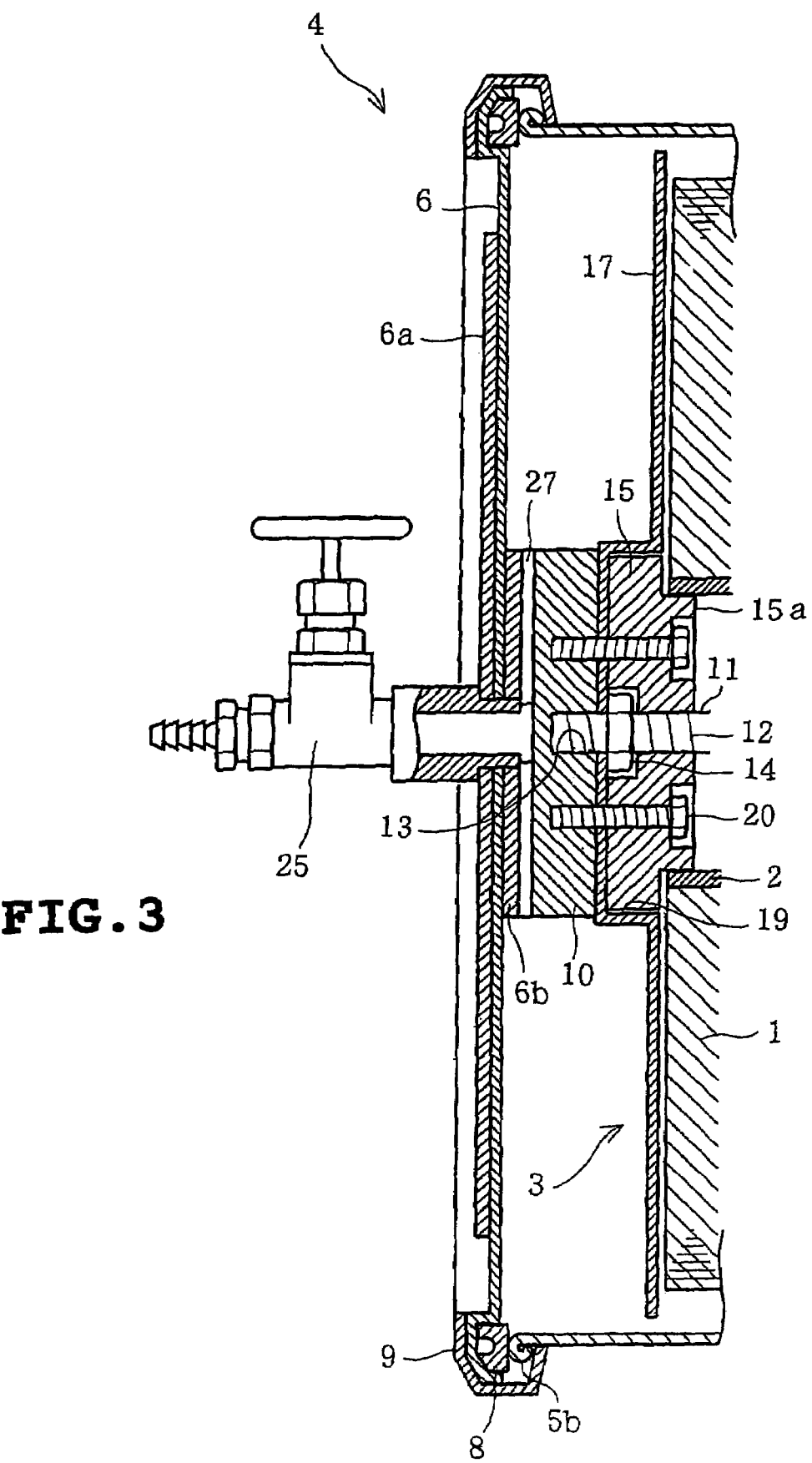
FIG. 3 is an enlarged longitudinal side section of the cover of the container.

The container for containing the foregoing electrode sheet will now be described in detail with reference to FIGS. 1, 2 and 3. The electrode sheet 1 finished in the drying step is wound onto a cylindrical resin bobbin 2 into a roll 3 as shown in FIG. 2. An adhesive tape (not shown) is applied to an end of the electrode sheet 1 to prevent the sheet from unwinding. A container 4 for containing the roll 3 includes a generally cylindrical container body 5 having an open end and a bottom, and a cover 6 detachably attached to the open end to close an opening. The container body 5 has a knob 5a.

Figure 1:
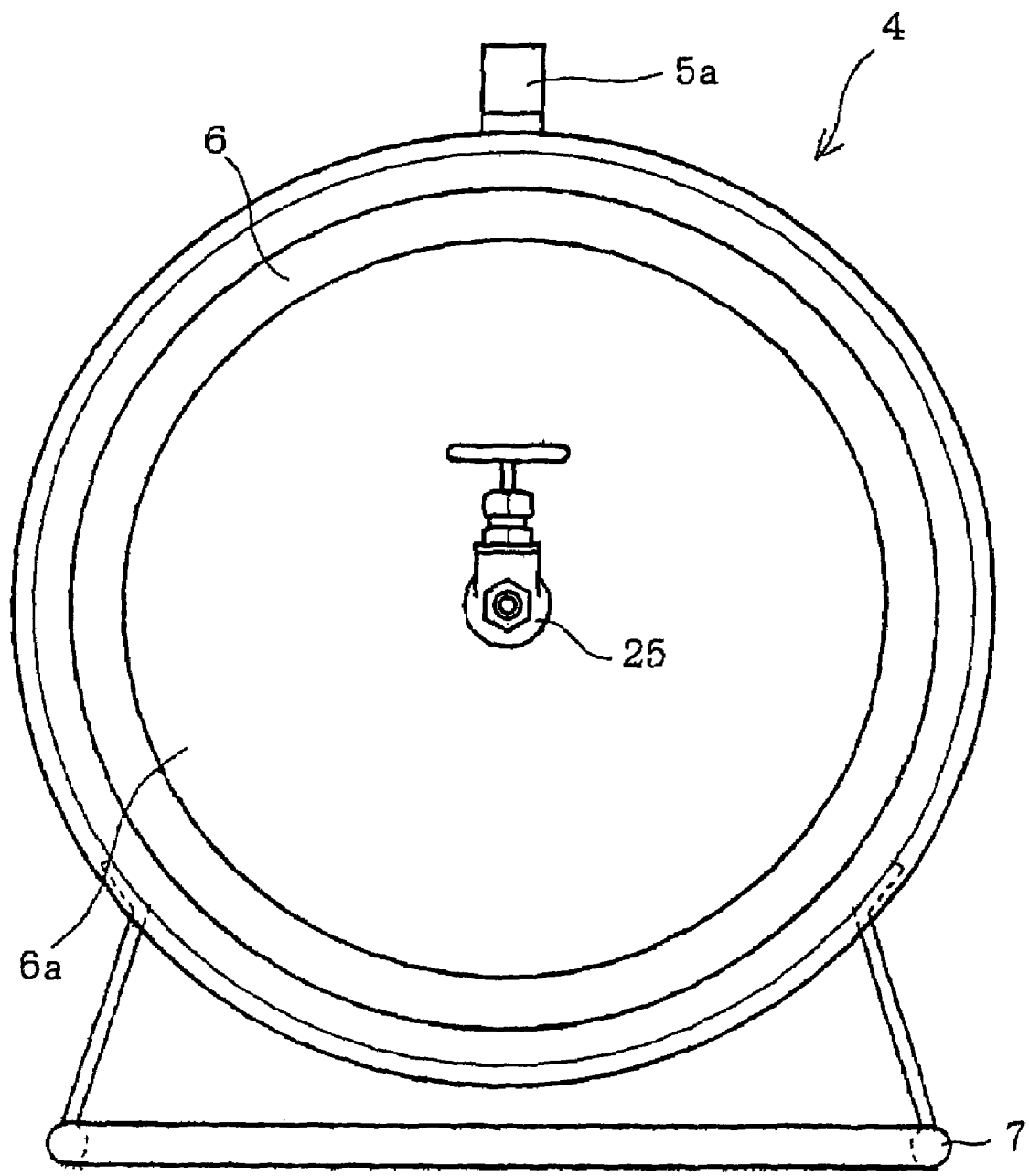
FIG. 1 is a front view of the container in accordance with an embodiment of the present invention.

The container body 5 is made of a corrosion resisting material, for example, stainless steel and mounted on a stand 7 so that an axis thereof extends horizontally as shown in FIG. 1. The cover 6 is also made of a corrosion resisting material, for example, stainless steel. A packing 8 serving as a sealing member is attached along an outer circumference of the cover 6. The packing 8 is made from an elastic material such as rubber or resin. The container body 5 has a stop 5b formed by curling an outer circumference of the open end thereof. The cover 6 is applied to the open end of the container body 5, and the outer circumference of the cover 6 and the stop 5a are fastened by a metal fastening band so that the cover 6 is fixed to the container body 5. In this case, the packing 8 is tightly held between the container body 5 and the cover 6, thereby hermetically sealing a gap between the container body 5 and the cover 6.

Two reinforcing plates 6a and 6b each made of stainless steel are fixed to an outside and inside of the cover 6 by welding or the like respectively. A stem 11 made of stainless steel is fixed to a mount 10 so as to extend horizontally at the center of an interior of the container body 5. In fixing the stem 11, a male thread 12 formed along an entire length thereof is threadedly engaged with a female thread hole 13 of the mount 10 and a lock nut 14 is threadedly engaged with the stem 11 for preventing loosening of the stem. The stem 11 extends through two support discs 15 and 16 each serving as a supporting member. The support discs 15 and 16 have fitting portions 15a and 16a fitted into both ends of the bobbin 2 respectively. The stem 11 further extends through two presser plates 17 and 18 serving as supporting members attached to widthwise ends of the electrode sheet 1 wound on the bobbin 2 respectively. The support discs 15 and 16 are made of a resin, for example, fluororesin. The presser plates 17 and 18 are made of stainless steel.

The support disc 15 and the presser plate 17 both disposed at one end side of the roll 3 are fastened by a bolt 20 to the mount 10 while the support disc 15 is fitted in a central concavity 19. In this case, the support disc 15 is fixed so that the fitting portion 15a protrudes to the roll 3 side. In this state, the stem 11 projects forward from the center of the fitting portion 15a. On the other hand, the support disc 16 and the presser plate 18 both disposed at the other end side of the roll 3 are connected to a central concavity 21 of the presser plate 18 by a bolt 22 so that the fitting portion 16a of the support disc 16 protrudes to the roll 3 side.

A fastening member 23 is threadedly engaged with a distal end of the stem 11 so that the roll 3 is fastened between the support discs 15 and 16 thereby to be fixed to the stem 11 and accordingly to the cover 6. More specifically, the fastening member 23 is made of a resin, for example, fluororesin and has a centrally located female thread hole 23a threadedly engaged with the male thread 12 of the stem 11. The fastening member 23 further has an outer circumferential portion formed with alternate concave and convex portions (neither shown) in order that the fastening member is easily turned. In order that the fastening member 23 may be prevented from loosening, a locking member 24 made of fluororesin has a central female thread hole 24a threadedly engaged with the stem 11 subsequently to the fastening member 23. The male thread 12 of the stem 11 and the fastening member with the female thread hole 23a serve as a fixing member for fixing the bobbin 2.

After the roll 3 has been contained in the container 4, the interior of the container 4 is charged with a dry inert gas such as gaseous nitrogen serving as drying gas so that the pressure in the container is slightly higher than an atmospheric pressure. For the purpose of charge with the gaseous nitrogen, a supply valve 25 is mounted on the cover 6 for the purpose of charge with the gaseous nitrogen, and a discharge valve 26 is mounted on the container body 4. The supply valve 25 has an inlet connected via a hose (not shown) to a gaseous nitrogen tank (not shown). Gaseous nitrogen discharged from an outlet of the supply valve 25 is supplied into the container body 5 through a groove 27 formed in an end face of the mount 10. Upon supply of the gaseous nitrogen into the container body 5, air in the container body 5 is discharged through the discharge valve 26 outside the container 4. A pressure gage 28 is mounted on the container body 5 for measuring an inner pressure in the container body.

A procedure for containing the roll 3 of the electrode sheet 1 in the foregoing container 4 will now be described. Firstly, the cover 6 is set on a jig (not shown) so that the stem 11 is directed upward. In this state, the stem 11 is inserted into the bobbin 2 of the roll 3 and one end of the bobbin 2 is fitted into the fitting portion 15a of the support disc 15. The stem 11 is then inserted through the other support disc 16 and the presser plate 18 so that the fitting portion 16a is fitted into the other end of the bobbin 2. The fastening member 23 is then threadedly engaged with the stem 11 so that the bobbin 2 is fastened between the support discs 15 and 16 thereby to be fixed. Subsequently, the locking member 21 is threadedly engaged with the stem 11 to tighten the fastening member 23, thereby preventing the fastening member from loosening.

Thereafter, the cover 6 is applied to the open end of the container body 5 so that the roll 3 is inserted into the container. The fastening band 9 is then attached to the cover 6 to fasten the latter tight. The supply valve 25 is connected to a gaseous nitrogen tank (not shown) and the supply valve is then opened while the discharge valve 26 is also open. The gaseous nitrogen is supplied into the container body 5 and air in the container body 5 is discharged through the discharge valve 26 outside the container 4. A pressure gage 28 is mounted on the container body 5 for measuring an inner pressure in the container body. Both supply and discharge valves 25 and 26 are closed under the condition where the pressure gage 28 shows pressure slightly higher than the atmospheric pressure.

The containing of the roll 3 is thus completed and the roll contained in the container 4 is transferred to a works where capacitors are manufactured. Since the roll 3 is fixed to the cover 6 side, the roll is prevented from moving during the transportation. Accordingly, there is no possibility that the roll 3 collides against the inner circumferential face of the container 5 thereby to be damaged. Furthermore, since the widthwise ends of the electrode sheet 1 wound on the bobbin 2 are pressed by the presser plates 17 and 18, there is no possibility that a wound turn of the electrode sheet 1 is slid on another turn such that the electrode sheet 1 drops out of the bobbin 2 into a conical shape, whereupon the electrode sheet 1 is unwound.

The support discs 15 and 16 which are rubbed against the bobbin 2 are made of fluororesin. Furthermore, the fastening and locking members 23 and 24 are also made of fluororesin. Nonconductive resin powder resulting from the rubbing is a fluororesin powder but not a metal powder. Since the fluororesin is a similar material to PTFE used as a binder of the electrode sheet 1, there is no possibility of adverse electrical effect on the electrode sheet. Moreover, since the container body 5, the cover 6, the stem 11 and the like are all made of stainless steel, there is no occurrence of metal powder due to rust, whereupon the electrode sheet can be prevented from being adversely affected.

The container 4 is filled with the dry gas or dry gaseous nitrogen and then closed tight. Accordingly, the sheet electrode 11 can be prevented from absorbing moisture during the transportation although the sheet electrode 11 comprises activated carbon as a main component and accordingly, an increase in the water content of the electrode sheet can be prevented. Furthermore, when the container 4 is charged with an inert gas such as gaseous nitrogen as in the foregoing embodiment, the roll 3 can be prevented from oxidation and the inner circumferential face of the container 4 can be prevented from rust for a long period of time. Moreover, the pressure of the inert gas filling the closed container 4 is set to be slightly higher than the atmospheric pressure. Accordingly, outside air can be prevented from entering the container 4 through even a slight gap.

The present invention should not be limited to the foregoing embodiment and may be modified as follows:

The container body 5 is cylindrical in the foregoing embodiment. However, the container body may be formed into a square pillar. Furthermore, the container body 5 may have both open ends which are closed by respective covers.

The container body 5 may be made of aluminum although it is made of stainless steel in the foregoing embodiment. Resin coating may be applied to the inner circumferential face of the container body 5 in order that occurrence of metal powder due to rust may be prevented.

A plurality of rolls 3 may be fixed on the stem 11. Furthermore, the stem 11 may be mounted on the container body 5 side. Two stems may be provided on the container body 5 side and the cover 6 side respectively. The support discs 15 and 16, the fastening member 23 and the locking member 24 may be made of another resin, instead of fluororesin. The cover 6 may have a function of the presser plate without provision of the individual presser plate 17 at the cover 6 side. The dry gas filling the container 4 may be air.

The foregoing description and drawings are merely illustrative of the principles of the present invention and are not to be construed in a limiting sense. Various changes and modifications will become apparent to those of ordinary skill in the art. All such changes and modifications are seen to fall within the scope of the invention as defined by the appended claims.

We claim:

1. A container for containing a roll formed by winding a long electrode sheet for electric double layer capacitors on a bobbin, the electrode sheet having a predetermined width perpendicular to a length thereof and being formed by placing electrodes on both sides of a current collector, the roll formed by winding the long electrode sheet having two radially extending sides spaced apart by an amount equal to substantially the predetermined width, each electrode being formed by binding carbonaceous powder with a binder resin, the container comprising:

a container body having at least one end formed with an opening and made of stainless steel;

a respective cover closing each respective opening of the container body and made of stainless steel;

a sealing member sealing a gap between the container body and the cover;

a stem fixed to either the container body or the cover so that the bobbin is mounted thereon, the stem being made of stainless steel and formed with a male thread;

a bobbin fixing unit including a fastening member having a female thread hole and made of fluororesin, the bobbin fixing unit fastening the bobbin, thereby fixing the bobbin; and a holding unit including two presser plates, each of which is made of stainless steel and has a through hole, the holding unit being located at the two sides of the roll wound on the bobbin while the stem is inserted through the holes of the presser plates, respectively, the female thread hole of the fastening member being threadedly engaged with the male thread of the stem so that the presser plates are fastened thereby to be fixed, the holding unit holding the electrode sheet so as to prevent the electrode sheet from being detached from the bobbin while pressing the two ends of the electrode sheet.

2. A container according to claim 1, further comprising a valve capable of supplying a dry gas into the container body while the opening of the container body is closed by the cover.

3. A container according to claim 2, wherein the dry gas is an inert gas and an internal pressure of the container body is increased to be higher than an external pressure of the container body.

* * * * *